United States Patent [19]

Armstrong

[11] 4,381,546

[45] Apr. 26, 1983

[54] SYSTEM FOR THE QUANTITATIVE MEASUREMENT OF IMPAIRMENTS IN THE COMMUNICATION CHANNEL OF A QUADRATURE AMPLITUDE MODULATION DATA COMMUNICATION SYSTEM

[75] Inventor: Thomas R. Armstrong, Largo, Fla.

[73] Assignee: Paradyne Corporation, Largo, Fla.

[21] Appl. No.: 16,912

[22] Filed: Mar. 2, 1979

[51] Int. Cl.³ ............................................... H04B 3/14
[52] U.S. Cl. .................................... 364/514; 455/67; 364/574
[58] Field of Search ..................... 364/514, 572, 574; 325/477, 42, 67, 26; 455/50, 63, 67

[56] References Cited

U.S. PATENT DOCUMENTS

| | | | |
|---|---|---|---|
| 3,629,831 | 12/1971 | Mikus et al. | 364/514 |
| 3,631,490 | 12/1971 | Palmieri | 364/574 X |
| 4,028,697 | 7/1977 | Albanese et al. | 364/574 X |
| 4,035,625 | 7/1977 | Chiu et al. | 364/514 |
| 4,074,358 | 2/1978 | Caputo et al. | 364/514 |

Primary Examiner—Edward J. Wise
Attorney, Agent, or Firm—Kane, Dalsimer, Kane, Sullivan and Kurucz

[57] ABSTRACT

A system is provided for measuring communication channel impairments in a data transmitting system which employs quadrature amplitude modulation. The system rotates each point of sampled eye diagram information by a phase angle determined by the ideal value of the received point information so that the rotated point has its nominally maximum component on the real axis.

16 Claims, 20 Drawing Figures

Eight Point (CCITT V.27) Eye Diagram

Four Point (CCITT V.26) Eye Diagram

Four Point (CCITT V.26) Eye Diagram

Eye Diagram with Gaussian Noise

Eye Diagram with Phase Jitter

Eye Diagram with Frequency Offset (first order carries recovery phase lock loop)

Eye Diagram with Harmonic Distortion

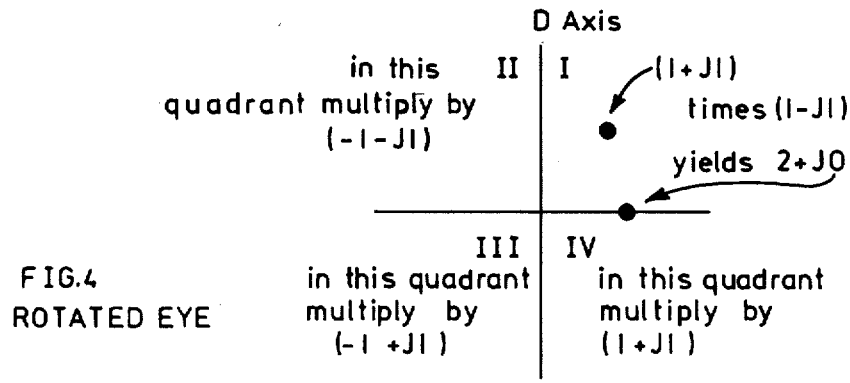
FIG.4 ROTATED EYE
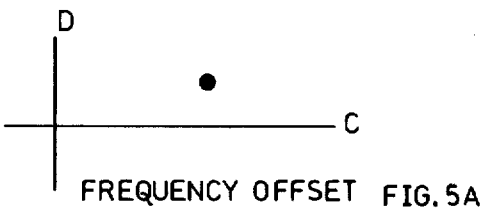
FREQUENCY OFFSET  FIG.5A
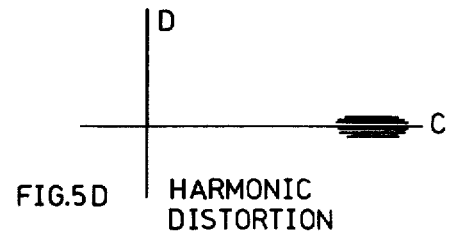
FIG.5D  HARMONIC DISTORTION
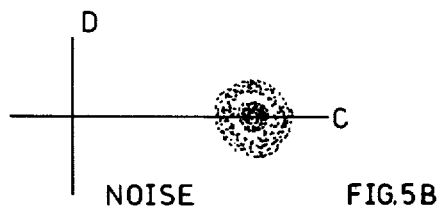
NOISE  FIG.5B
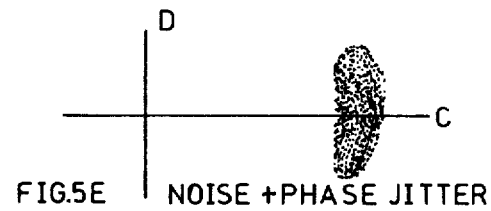
FIG.5E  NOISE +PHASE JITTER
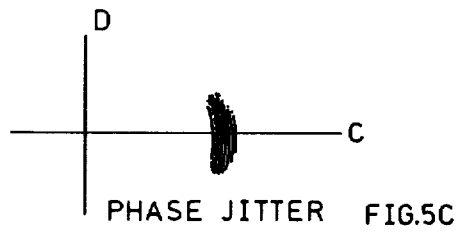
PHASE JITTER  FIG.5C
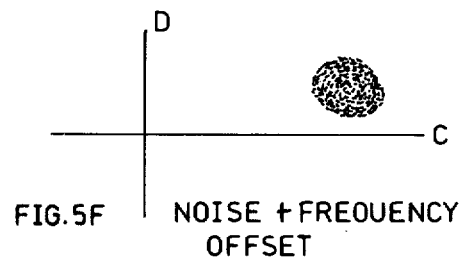
FIG.5F  NOISE +FREQUENCY OFFSET
IMPAIRMENTS WITH RESPECT TO ROTATED EYE FIG. 6
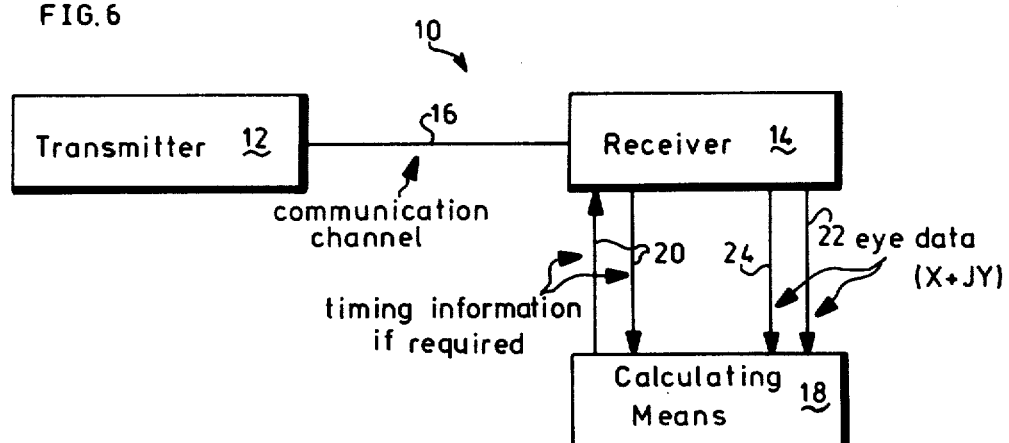
Channel Impairment Information
{ phase jitter
  noise
  distortion (intermodelation, harmonic)
  frequency offset
  hits (ampl. & phase)
  distortion (ampl./delay)
  etc.
FROM FIG. 9A
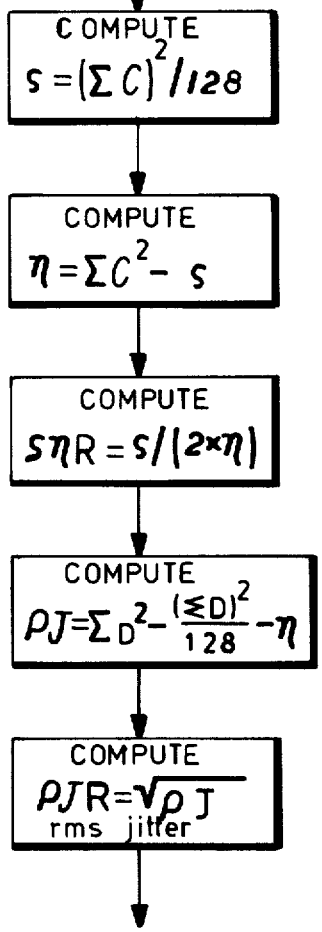
CONTINUED TO FIG. 9C
FIG. 9B
COMPUTATIONAL ALGORITHM CONTINUED

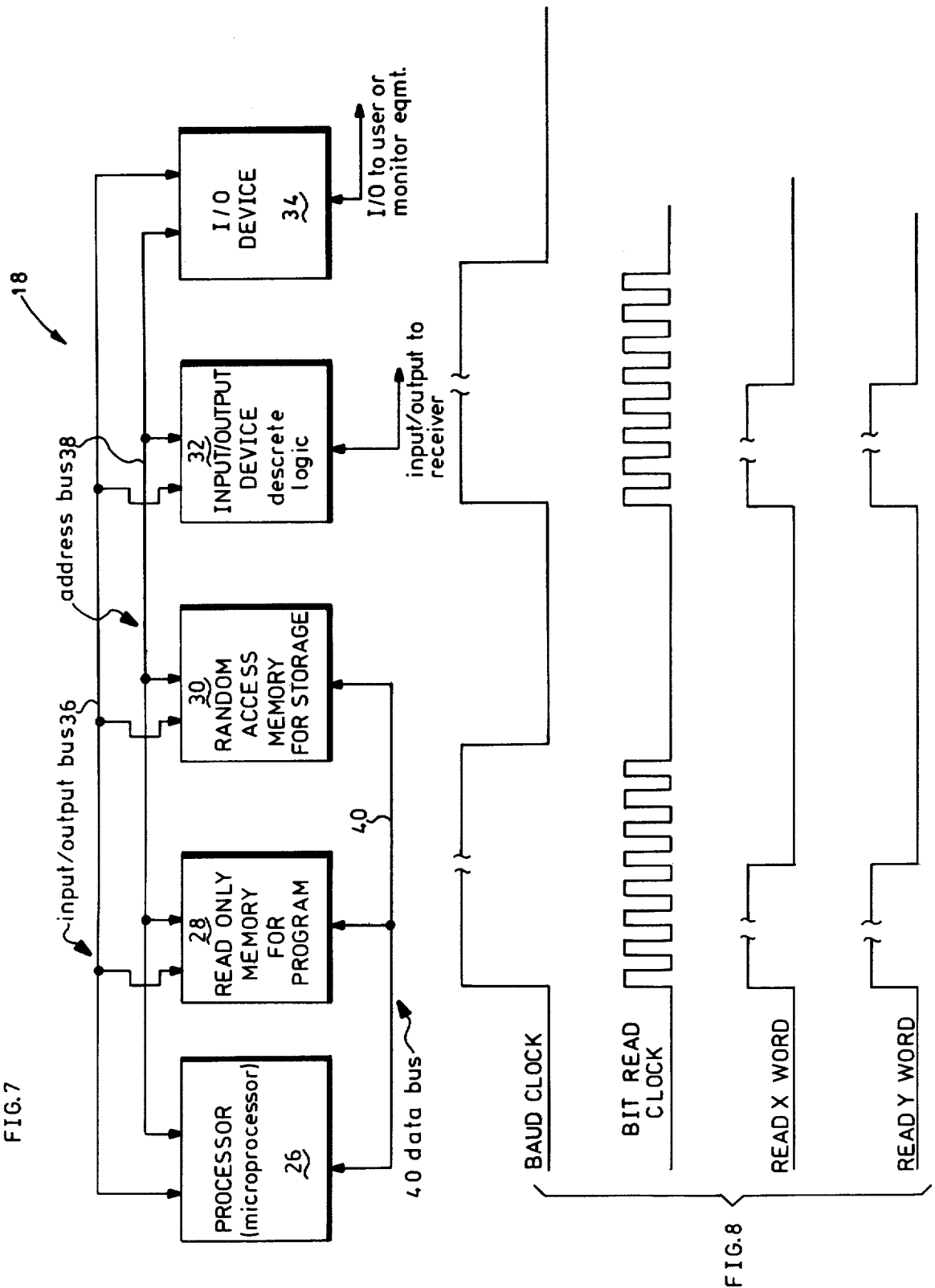

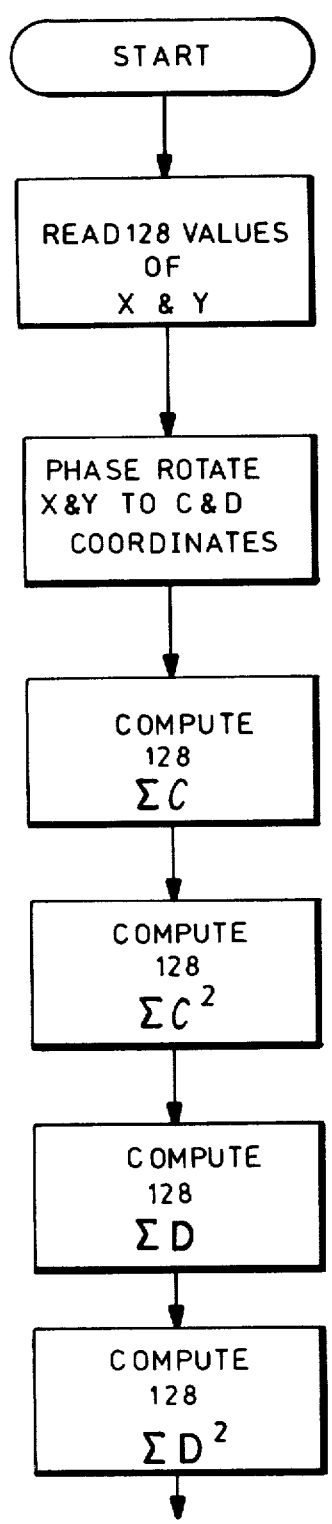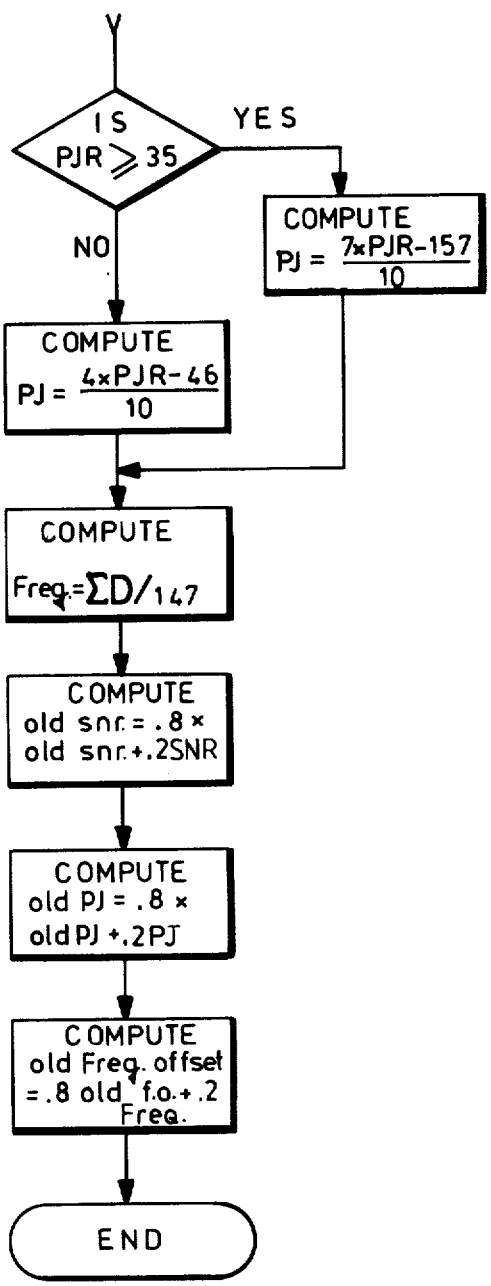

SYSTEM FOR THE QUANTITATIVE MEASUREMENT OF IMPAIRMENTS IN THE COMMUNICATION CHANNEL OF A QUADRATURE AMPLITUDE MODULATION DATA COMMUNICATION SYSTEM

BACKGROUND OF THE INVENTION

The present invention relates to data communications and in particular to a system for measuring impairments in a data communication channel employing quadrature amplitude modulation.

It has long been known that the performance of amplitude modulation data transmission systems could be evaluated qualitatively by the subjective evaluation of eye diagrams. The use of and generation of such signal constellations or eye diagrams is well known and disclosed in the art. See for example U.S. Pat. No. 4,035,625. Indeed, many manufacturers provide a voltage or meter indication which is proportional to the eye scatter for use as a rough indication of receiver performance.

With the increased usage of quadrature amplitude modulated transmission systems, which has occurred in recent times, qualitative analysis of the signal constellation diagrams (sampled eye diagrams on a 2-dimensional plane) has been accepted as a means of evaluating the performance of the various types of QAM systems.

In FIGS. 1 and 2 there are shown respectively 8 and 4 point idealized signal constellations or eye diagrams. The horizontal axis of these diagrams may be referred to as the real, "X" or in-phase channel axis. The vertical axis may be referred to as the imaginary, "Y" or quadrature channel axis. FIG. 1 depicts an 8 point eye diagram obtained by combining the 4 point eye diagrams depicted in FIGS. 2A and 2B. 16 point eye diagrams are also obtainable as discussed in the above noted patent.

The eye diagrams are typically viewed by a technician or operator on an oscilloscope screen by modulating the horizontal axis with the X-signal and the vertical axis with the Y-signal.

Degradation of the communication channel manifests itself on the eye diagram in relatively well defined modes, the more common of which are depicted in FIGS. 3A-3D which, in its ideal form would correspond to FIG. 2A. Thus, if the communication medium is degraded by gaussian noise, the small clearly defined dots of the receiver eye diagram depicted in FIG. 2A would enlarge to roughly circular areas as a result of the noise having been added to the data signal. This is shown in FIG. 3A wherein the diameter of the circular areas is a measure of the noise. Phase jitter contributed by the communications media results in the clearly defined dots of FIG. 2A being displaced as an arc centered at the ideal points. This is depicted in FIG. 3B. Frequency offset and harmonic distortion cause the unique changes in the eye diagram as depicted in FIGS. 3C and 3D respectively.

As noted, since the various distortions manifest themselves in a unique fashion on the eye diagram, it would appear that a qualitative determination of the communications channel could be made by study of the eye diagram. In actual practice, however, the situation becomes complicated by the fact that the degrading influences can be cumulative and thus the clearly defined patterns depicted in FIGS. 3A-3D become distorted by the interaction of the combination of degrading factors. In addition, the eye diagram data does not lend itself to quantitative analysis of the condition of the communications channel primarily because the degrading effect in opposite quadrants tend to cancel each other out. As a result, heretofore, quantitative evaluation of the communication media has not been possible from the eye diagram.

In view of the above, it is the principal object of the present invention to provide an improved system for quantitatively evaluating data transmission over a communication media.

A further object is to provide such a system which operates in service while normal data is processed by the communications system and without interfering with the communication of the data.

A still further object is to provide such a system which may be applied to regular quadrature amplitude modulation data communication systems as well as to communication systems employing combined amplitude/phase modulation, phase shift keying, double side band modulation, etc.

Still further objects and advantages will become self-evident from the following description of the invention.

SUMMARY OF THE PRESENT INVENTION

In accordance with the present invention, a data communications system comprising a transmitter, receiver, modulation means for quadrature amplitude modulating data transmitted over the communications channel to the receiver, and a communications channel linking the transmitter to the receiver is provided. As a result, a signal constellation or eye pattern is available at the receiver. It should be noted at the outset that the present invention may be applied to any one of a wide class of QAM techniques including amplitude-QAM, combined amplitude and phase modulation, double side band modulation or pure phase shift key modulation.

The present invention provides for the phase rotation of each received point by an "ideal" phase angle determined by the ideal value of the received point and selected so that the rotated point has its nominally maximum component on the real (i.e., horizontal) axis. Once such rotation is effected, line impairments of the communications link may readily be distinguished from one another and quantitatively analyzed.

For purposes of the following description, the ideal real axis—i.e., the axis upon which the nominally maximum component of each received point falls when phase rotated by an ideal phase angle according to the ideal value of the received point is denoted the "C" axis. The imaginary ideal axis is denoted the "D" axis.

BRIEF DESCRIPTION OF THE DRAWINGS

In the accompanying drawings:

FIG. 4 depicts the eye diagram of FIG. 2A rotated in accordance with the present invention;

FIGS. 5A-5F is similar to FIG. 3 and depict the manner in which impairments to the communications channel reflect themselves on the rotated eye;

FIG. 6 is a block diagram of a communications system incorporating the improvement of the present invention;

FIG. 7 is a block diagram of a calculating means used to develop channel impairment information;

FIG. 8 is a timing signal diagram depicting the relationship of the various signals; and, FIG. 9 is a flow chart of the necessary operations to obtain phase rotation and impairment data.

DETAILED DESCRIPTION OF THE PREFERRED EMBODIMENT

Figure 1:
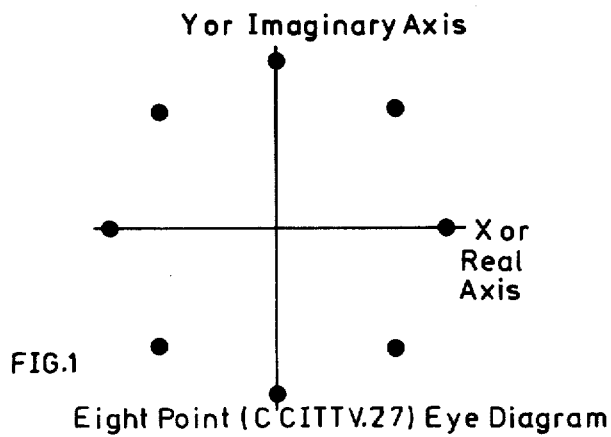
FIG. 1 is a ideal 8 point signal constellation or eye diagram.
Figure 2A:
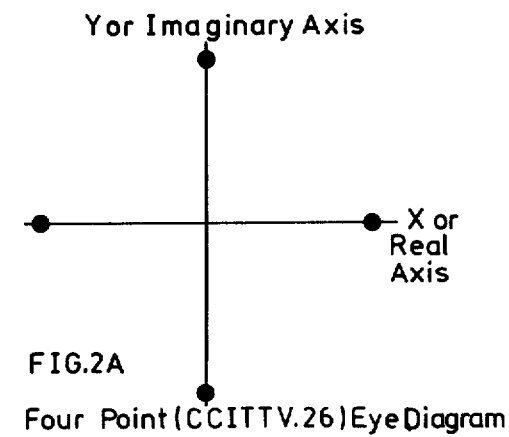
FIGS. 2A and 2B depict two ideal 4 point eye diagrams.
Figure 2B:
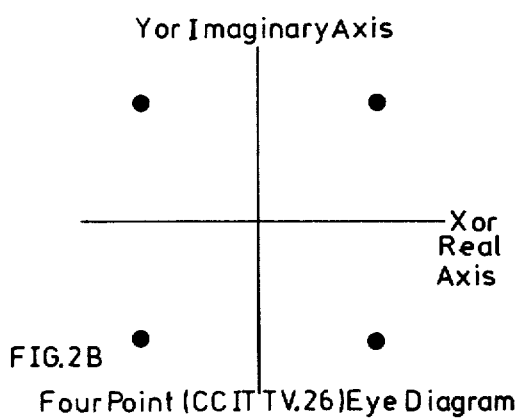

Reference is now made to FIG. 6 wherein a typical communications system 10 incorporating the present invention is depicted. The communications system is comprised of a transmitter 12, receiver 14, and a communications channel or link 16 interconnecting the two. The channel may, for example, comprise a commercial military or foreign voice grade telephone line interconnecting the transmitting and receiving station both of which are provided with communication modems, the receiving modem, at least, generating a signal constellation or eye diagram. The transmitter 12 employs QAM modulation and each baud time transmits one of four phases of a carrier which is equivalent to transmitting one of two amplitude levels on each of two quadrature carriers as illustrated in FIG. 2B.

Communication channel 16 is four-wire full duplex or simplex. It also may be comprised of PCM links, microwave links, telephone line VF, etc.

The receiver 14 is a QAM receiver which detects one of the four possible phases of each baud time and outputs two data bits at a baud rate R. Hence, the bit rate of the communication system is 2R bits per second. If R equaled 1200 then the data rate is 2400 bits per second. The overall communication system may also employ 4 phase PSK which is mathematically equivalent to a particular two-level QAM system.

The above described system is well known, defined in the art and commercially available from several sources. In accordance with the present invention, a calculating means 18 is provided auxiliary to the receiver 14. The calculating means provides several functions. It is capable of reading X and Y eye data from the receiver each baud time. A baud clock 1200 Hz and a higher speed clock 14.4 KHz are supplied to the calculating means 18 from receiver 14 via channels 20. Two channels, 22 and 24 also extend between receiver 14 and calculating means 18 for passing X and Y eye data bits from the receiver to the calculating means. Timing of the various signals is shown in FIG. 8.

At the positive transition of the baud clock (1200 Hz) the values of the X component and Y component of the signal constellation or eye diagram are available in digital form. On the first negative edge of the bit clock which appears after the baud clock, the first data bit of the 8 bit word corresponding to the value of X and Y is available. The calculating means uses this negative transition to read the first bit of X and Y. On each of the seven subsequent negative edges of bit clock the remaining seven data bits of X and Y are read from receiver 14 to calculating means 18. This process is repeated for each baud time. Hence, by means of the timing signals—and data lines 22 and 24—the calculating means is capable of accumulating digital words which correspond to the values of the X and Y components of the eye.

In FIG. 2b there is depicted a representative 4 point signal constellation or eye diagram typical of the type obtained at the receiver such as receiver 14 of a quadrature amplitude modulator transmission system. In accordance with the present invention, each point of the eye diagram is rotated as shown in FIG. 4. If a receiver point is determined to be in quadrant 1, its complex value $(X+jY)$ is multiplied by $(1-j1)$ to yield $(X+Y+jY-jX)$. This would reduce to $(2+j0)$ if X and Y both equal 1. Similarly, points in quadrants II, III and IV would be multiplied respectively by $(-1-j1)$, $(-1+j1)$, and $(1+j1)$ to obtain the desired rotation of the present invention. That is, each point is rotated by an ideal phase angle determined by the ideal value of the received point and selected so that the rotated point has its nominally maximum component on the real axis.

Figure 3A:
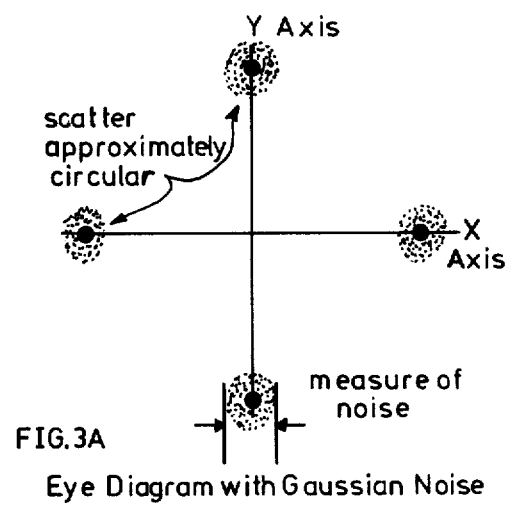
FIGS. 3A-3D depict the manner in which various line impairments reflect themselves on the eye diagram of FIG. 2A.
Figure 3B:
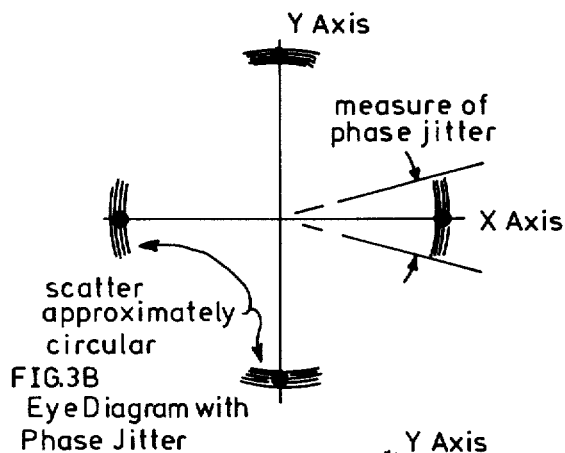
Figure 3C:
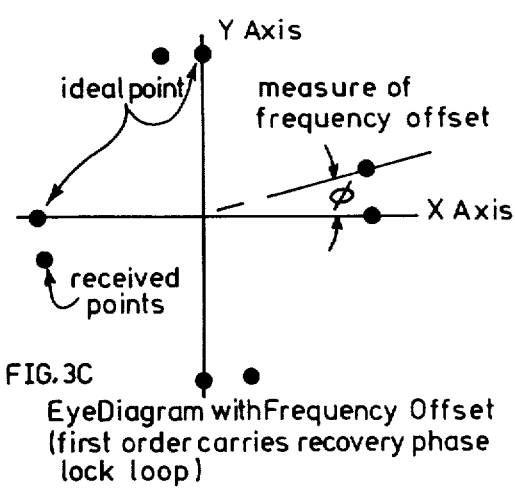
Figure 3D:
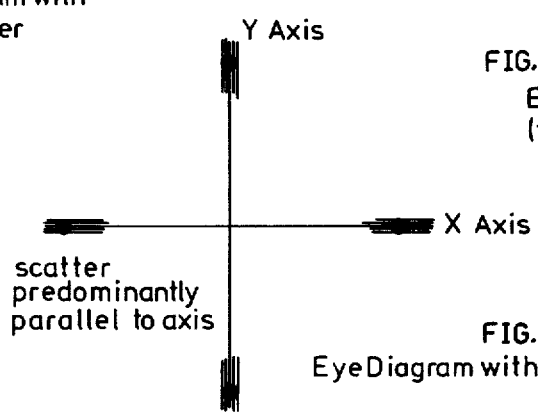

Once the points are rotated from the X and Y axis to what has been defined as the C and D axis, line impairments may be readily distinguished from one another by means of statistical properties on the C and D axes. The line impairments of the rotated eye are depicted in FIGS. 5a-f wherein various impairments and combinations of impairments are depicted. For example, frequency offset (with a first order carrier recovery loop) yields a non-zero value for the expected value of the variable on the D axis as shown in FIG. 5a. This may be compared with FIG. 3c wherein the value is zero. Noise is characterized by the same variants (less the mean on both axes) as shown by a comparison of FIGS. 5b and 3a. Other line impairments may also be readily distinguished as shown.

A quantitative analysis of the degree of line degradation can be determined by computing the four variables 1. $\sum_{i=1}^{l=m} C_i$ 2. $\sum_{i=1}^{l=m} C_i^2$ 3. $\sum_{i=1}^{l=m} D_i$ 4. $\sum_{i=1}^{l=m} D_i^2$ The above variables lead to channel impairment information by the following calculations:

Signal Power = $S = (\Sigma C_i)^2/m$
Noise = $N = \Sigma C_i^2 - S$
Frequency Offset = $F = \text{constant} \times \Sigma D_i$
Phase Jitter = $PJ = \text{constant} \times (\Sigma D_i^2 - (\Sigma D)^2/m - N)$ A determination of the effect of harmonic distortion is made by determining if $$\Sigma C_i^2 - (\Sigma C_i)^2/M >> \Sigma D_i^2$$

If so, then harmonic distortion is a serious contributor to channel degradation.

In an embodiment of the present invention in which the receiver 14 was a model LSI24 data modem produced by the Paradyne Corporation of Largo, Fla., the calculation means capable of performing the necessary eye rotation and mathematical computations was a microcomputer as shown in FIG. 7. In essence, the microcomputer comprised a microprocessor 26, read only memory for data storage 28, random access memory for data storage 30 and input output devices 32 and 34. These components are readily available and described elsewhere and may comprise, for example, a Texas Instrument 9980 16 bit microprocessor, Texas Instrument TMS 4045RAM, Texas Instrument TMS 2716ROM, and Texas Instrument TSM 9902 input output device.

Connectivity, architecture and timing within the calculating means 18 is fully described in the literature. Briefly, the I O bus 36 is used to control data transfer to or from microprocessor 26. Address bus 38 is used to address the peripheral elements ROM 28, RAM 30 and the input output devices 32 and 34. Data bus 40 is employed for the actual data transfer to or from the microprocessor. The actual mathematical operations to rotate the eye and extract desired parameters is performed by software or firmware implemented in the microprocessor although it could just as easily have been implemented by hardware to perform the collection and numerical operations set forth in the flow chart of FIG. 9. As shown, 128 points of X-axis and Y-axis data is collected. This corresponds to one complex eye sample for each of 128 baud times which at 1200 baud requires $128/1200 = 11$ milliseconds. The 128 complex points are phase rotated to the C and D coordinate system as previously discussed. After phase rotation or coordinate transformation, the four variables $$\sum_{l=1}^{l=m} C_l$$

$$\sum_{l=1}^{l=m} C_l^2$$

$$\sum_{l=1}^{l=m} D_l$$

$$\sum_{l=1}^{l=m} D_l^2$$

are computed and stored. The following equations are then solved to determine signal power, noise, frequency offset and phase jitter Signal Power = $S = (\Sigma C_l)^2/m$
Noise = $N = \Sigma C_l^2 - S$
Frequency Offset = $F = \text{constant} \times \Sigma D_l$
Phase Jitter = $PJ = \text{constant} \times (\Sigma D_l^2 - (\Sigma D)^2/m - N$ Signal-to-noise ratio (SNR) is then computed according to the equation.

$$SNR = S/(2N)$$

The term "$(\Sigma D_l)^2/m$" removes any contribution to phase jitter from frequency offsets. The term "N" is included in the computation of phase jitter to remove any contribution to phase jitter from noise which may be present on the D axis.

Other parameters as set forth in the flow chart of FIG. 9 may also be determined by solving the associated equations.

It should be noted that each of the desired measurements (i.e., signal power, noise, phase jitter, frequency offset, etc.) while relating to the condition of the communications link 16 is computed from information obtained from the receiver while in service and on a non-interfering basis. That is, the testing of the communications link is conducted in a manner transparent to the communications link. It should also be noted that while the phase rotation and calculations have been described as being performed by software or firmware within a microcomputer in the preferred embodiment of the present invention, these steps could just as readily have been done by discrete hardware or appropriate circuitry.

It is to be understood that the foregoing features and principles of this invention are merely descriptive and that many departures and variations thereof are possible by those skilled in the art without departing from the spirit and scope of the invention which is set forth in the following claims.

Having thus described the invention, what is claimed is:

1. In a data communications system employing quadrature amplitude modulation comprising; a transmitter receiver, and a communication channel linking said transmitter and receiver, said receiver producing sampled eye diagram point information wherein each received point is defined in a coordinate system in which a first axis is the in-phase channel axis and a second axis is the quadrature channel axis, the improvement comprising: means for rotating said received points by an operand determined by the ideal value of the receiving point information so that each rotated point has a first nominally maximum component on a new first axis and a nominal second component on a new second axis and means for determining the characteristics of said communication channel from variances and means of the components.

2. The system in accordance with claim 1 wherein said operand rotates said received points so that each rotated point has its nominal minimum component on said new second axis.

3. The system in accordance with claim 2 wherein said operand is multiplied by said received points.

4. The system in accordance with claims 1 or 2 wherein said new axes are perpendicular to each other.

5. The system in accordance with claims 1 or 2 wherein said operand rotates each of said received points.

6. The system in accordance with claim 2 wherein the variances and means of the components are combined according to the following formula to yield quantitative data for signal to noise ratio (SNR) on said communications channel:

$$SNR = S/2N$$

wherein
$S = $ signal power $= (\Sigma C_l)^2/m$
$N = $ noise $= \Sigma C_l^2 - S$
$C_l = $ sampled point value on said first axis
$m = $ number of points sampled.

7. The system in accordance with claim 6 wherein the variances and means of the components are combined according to the following formula to yield quantitative data for phase jitter (PJ) on said communication channel:

$$PJ = K_2(\Sigma D_l^2 - (\Sigma D_l)^2/m - N)$$

wherein
$K_2 = $ constant
$D_l = $ sampled point value on said second axis.

8. The system in accordance with claim 2 wherein the variances and means of the components are combined according to the following formula to yield quantitative data for frequency offset (F) on said communication channel:

$$F = K_1(\Sigma D_i)$$

wherein
$K_1$ = constant
D = sampled point value on said second axis.

9. The system in accordance with claim 1 wherein said operand is multiplied by said received points.

10. A method for obtaining quantitative data regarding the status of the communications channel in a data communications system employing quadrature amplitude modulation and comprising a transmitter, a receiver and a communications channel linking the transmitter and receiver, said method comprising the steps of:
  (a) producing sampled eye diagram point information by the receiver wherein each received point is defined in a coordinate system in which a first axis is the in-phase channel axis and a second axis is the quadrature channel axis;
  (b) rotating said received points by an operand determined by the ideal value of the received point information so that each rotated point has its nominally maximum component on a new first axis and a second nominal component on a new second axis; and,
  (c) determining the characteristics of the communications channel from variances and means of the components.

11. The method in accordance with claim 10 further comprising the step of rotating said received points so that each rotated point has its nominal minimum component on said new second axis.

12. The method in accordance with either of claims 10 or 11 comprising the steps of multiplying said operated-on points from said first and second axes to said new first and second axes.

13. The method in accordance with claim 12 wherein said operand rotates sampled eye diagram received point.

14. The method in accordance with claim 11 further comprising combining the variances and means of the components according to the following formula to yield quantitative data for signal to noise ratio (SNR) on said communication channel:

$$SNR = S/2N$$

wherein
S = signal power = $(\Sigma C_i)^2/m$
N = noise = $\Sigma C_i^2 - S$
C = sampled point value on said first axis
m = number of points sampled.

15. The method in accordance with claim 11 further comprising combining the variances and means of the components according to the following formula to yield quantitative data for frequency offset (F) on said communication channel:

$$F = K_1(\Sigma D_i)$$

wherein
$K_1$ = constant
$D_i$ = sampled point value on said second axis.

16. The method in accordance with claim 11 further comprising combining the variances and means of the components according to the following formula to yield quantitative data for phase jitter (PJ) on said communication channel:

$$PJ = K_2(\Sigma D_i^2 - (\Sigma D_i)^2/m - N)$$

wherein
$K_2$ = constant
$D_i$ = sampled point value on said second axis.

* * * * *